United States Patent [19] [11] Patent Number: 4,496,028
Peterson [45] Date of Patent: Jan. 29, 1985

[54] INSTANT SAWHORSE

[76] Inventor: Theodore A. Peterson, P.O. Box 113, Chuluota, Fla. 32766

[21] Appl. No.: 581,737
[22] Filed: Feb. 21, 1984
[51] Int. Cl.3 .......... F16M 11/00
[52] U.S. Cl. .......... 182/186; 182/226
[58] Field of Search .......... 182/186, 181-185, 182/224, 225, 226

[56] References Cited

U.S. PATENT DOCUMENTS

| | | | |
|---|---|---|---|
| 1,174,964 | 3/1916 | Bradley | 182/186 |
| 2,983,329 | 5/1961 | Brown | 182/186 |
| 3,311,194 | 3/1967 | Kriplen | 182/186 |
| 3,379,282 | 4/1968 | Knuth | 182/186 |
| 3,406,786 | 10/1968 | Lang | 182/226 |
| 3,995,716 | 12/1976 | Bond | 182/186 |

*Primary Examiner*—Reinaldo P. Machado
*Attorney, Agent, or Firm*—Julian C. Renfro

[57] ABSTRACT

A sawhorse utilizing no nails or other fasteners comprising an elongate, generally circular member having a comparatively thick sidewall, but being otherwise hollow. The generally circular member is made of resilient material, having a spring-like quality, and the sidewall of the member is longitudinally cut for its entire length in a direction essentially parallel to the centerline of the generally circular member. Also, a pair of leg-receiving holes are cut through the generally circular member at a location substantially opposite from the longitudinal cut, with such holes being circumferentially spaced apart, and each being substantially equidistant from the ends of the circular member. Each of these holes is arranged to receive the upper end of an elongate leg member. Therefore, as the user draws the bottoms of the leg members together, the edges of the longitudinal cut are caused to move apart, so as to be able to receive the central beam of a sawhorse, and thereafter to tightly grasp such beam in a pincers-like grip when the leg members are released. Typically, two of the generally circular members are utilized for each sawhorse, with each member having associated therewith a pair of legs. The generally circular members may be made of PVC, such as of three inch inside diameter, and the longitudinal cut may be beveled in order to increase the power with which the central beam of the sawhorse is gripped by the edges of the cut.

11 Claims, 5 Drawing Figures

INSTANT SAWHORSE

BACKGROUND OF THE INVENTION

Sawhorses of one type or another have been in use by carpenters and others for many centuries, and almost every one alive today has seen the typical sawhorse made up of a 2 ×4 center beam supported by a pair of 2 ×4 legs at each end. Quite obviously the center beam can be a 2 ×6 or other such component, and the leg arrangement may vary, but typically this common type of sawhorse is nailed together into a rigid assembly that makes it difficult and bulky to move, and cumbersome to store.

Very popular in recent years has been the folding type of sawhorse, typically having pivotally mounted steel legs, and with some of these devices having clamping means at the work surface so that in addition to being usable as a sawhorse, they can also serve as a fairly sturdy mounting for flat, round or irregularly shaped items that are to be sawed, glued, sanded, or painted.

Although the folding type of sawhorse can be set up quickly and refolded quickly, the price of these items puts it out of the reach of many amateur or part time carpenters, and because the hinged joints of the device must be kept clean in order for the device to remain functional, most persons having folding sawhorses would be disinclined to use it during a paint spraying operation, for example.

It was to overcome to expense of the folding sawhorse, and the cumbersomeness of the nailed sawhorse that I was motivated to evolve the present invention.

SUMMARY OF THE INVENTION

My instant sawhorse is nail-less, and involves a minimum number of ingredients, typically a center beam and four legs. The center beam may be a 2 ×4 or 2 ×6 of selected length, and the legs may be four comparatively short 2 ×4's, usually of equal length.

The means by which a pair of legs are removably secured to each end of the center beam takes the form, in accordance with this invention, of an elongate, generally circular member having a comparatively thick sidewall, but being otherwise hollow. Importantly, the generally circular member is made of resilient, spring-like material whose sidewall has been longitudinally cut for its entire length in a direction generally parallel to the centerline of the generally circular member. This member may be of metal, but a section of PVC pipe is quite satisfactory in most instances.

A pair of leg-receiving holes are cut through the sidewall of the generally circular member at a location substantially opposite from the longitudinal cut. These holes are circumferentially spaced apart, and each is substantially equidistant from the ends of the circular member. Each of these holes is of a proper size and configuration to receive the upper end of a leg member. Thus, upon the upper ends of the legs being inserted into the leg-receiving holes, and the bottoms of the pair of leg members being grasped and drawn together, the edges of the longitudinal cut are caused to move apart. Thus, the generally circular member is able to receive one end of the center beam of a sawhorse, and to tightly grasp such beam in a pincers-like grip when the leg members are released. Quite obivously, a generally circular member with its pair of leg members is used at each end of the central beam, thus to define a sawhorse that is easily set up and thereafter easily disassemblied. However, in some instances, a single pair of wide legs may be used with a single circular member of substantial width in accordance with this invention.

Although the longitudinal cut through each of the generally circular members of a sawhorse in accordance with my invention may be an ordinary straight cut, I have found that by cutting a notch or bevel of say 60° the length of the longitudinal cut, the ability of the generally circular member to grasp the central beam of the sawhorse can be increased, but some versions of my invention do not require the bevel cut.

Although the legs could be made up of four ordinary 2 ×4 legs of similar length and square ends, I prefer to diminish the size of the upper ends of the legs somewhat, thus allowing additional penetration into the leg holes of the generally circular member. Preferably I utilize a beveled upper end on each leg, with the angle of the bevel generally corresponding to the angle each leg makes to a vertical plane passing through the central beam of the sawhorse. In that way, the contact area of the upper end of each leg member with the central beam of the sawhorse is maximized, thus contributing substantiall to the stabiliy of the sawhorse.

Although not indispensable, I prefer to cut a transverse notch near the upper end of each leg, which notch is on the side opposite the bevel, and which notch engages the sidewall of the generally circular member at the location of the respective leg hole. Considerably increased load carrying ability is made possible by the utilization of a transverse notch near the upper end of each of the four members, because each notch, by engaging the edge of its leg hole, serves to force the edges of the longitudinal cut more tightly against the center beam of the sawhorse.

Although the resilient, generally circular member can be made of certain metals such as aluminum or an alloy, or even made of fiberglass, I have found that schedule 40 PVC pipe of say three inch diameter will serve quite well and accomplish its purpose at a minimum of expense. Similarly, legs other than of 2×4's can be used, but usually any additional expense above the cost of 2×4's could not be justified.

It is therefore a primary object of this invention to provide a sturdy sawhorse at a minimum of expense.

It is another object of my invention to provide a sawhorse that may be assemblied quickly without the use of tools of any kind, which forms a strong and sturdy support for many operations to be carried out by a carpenter, housewife, painter or the like, and which can thereafter by disassemblied quickly and stored in a minimum of space.

It is yet another object of my invention to provide a nailless sawhorse that can be assembled and disassembled without tools, but which can be moved in an assembled condition without the fear of it suddenly coming apart.

It is still another of my invention to expand upon the already large number of uses to which short lengths of PVC pipe can be put, which PVC pipe can be configured to serve as the member holding the components of a sawhorse together in a simple yet highly effective way.

These and other objects, features, and advantages will become more apparent from a study of the appended figures of drawing.

DETAILED DESCRIPTION OF THE PREFERRED EMBODIMENT

Figure 1:
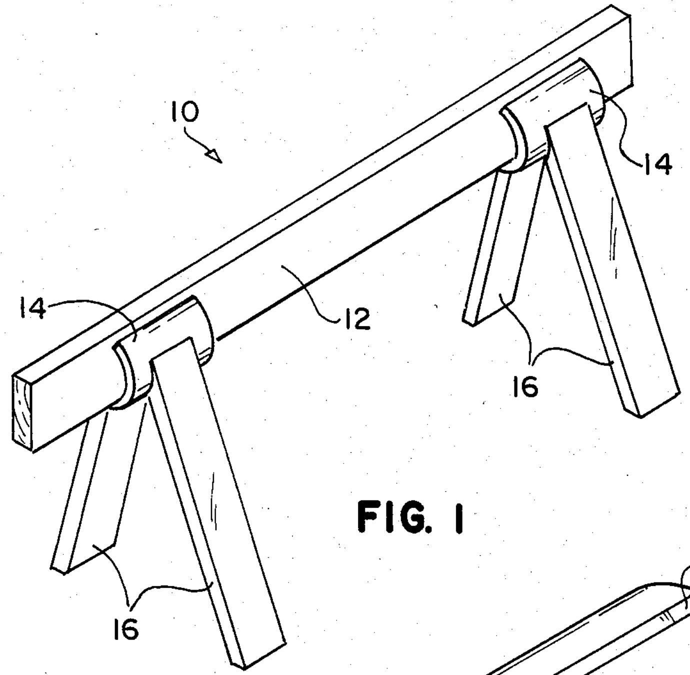
FIG. 1 is a generally perspective view of a sawhorse arrangement in accordance with this invention, involving the use of a novel generally circular, spring-like member at each end, which serve to hold the several sawhorse components firmly together.

Turning to FIG. 1, it will there be seen that I have shown a typical sawhorse 10 in accordance with this invention, involving a central beam 12, and a generally circular member 14 located near each end of the sawhorse.

In accordance with a construction soon to be described, the novel, generally circular members 14 serve as an effective means for receiving the upper ends of the legs 16 that serve as supports for the central beam 12.

Figure 2:
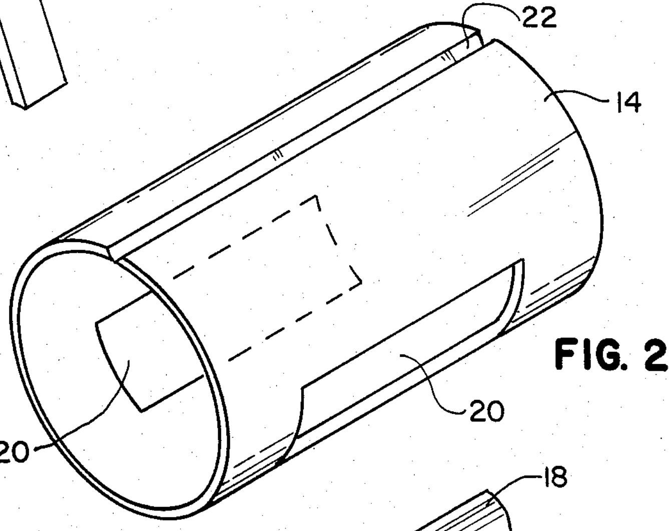
FIG. 2 is a perspective view to a somewhat larger scale of a typical generally cylindrical, spring-like member in accordance with this invention.
Figure 3:
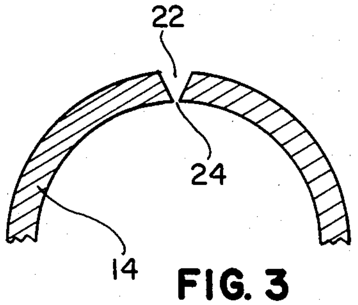
FIG. 3 is an enlargement of an end portion of the generally cylindrical member, showing the preferred configuration of the longitudinal cut.

With regard to FIG. 2, it will there be seen that I have shown to a larger scale, one of the generally circular members 14 in accordance with this invention. It contains a longitudinal cut 22, that is generally parallel to the longitudinal centerline of this member. To increase holding power, I prefer to configure the longitudinal cut 22 so that it includes a 60° angle or the like. This beveling of the longitudinal cut creates a pair of comparatively sharp edges 24, that are clearly visible in FIG. 3. Because these edges have minimal area, the generally circular member 14 tends to grip the central beam 12 of the sawhorse much more tightly than would otherwise have been the case. Also visible in FIG. 2 are the pair of holes 20 that receive the upper ends of legs 16. These holes are essentially opposite the longitudinal cut 22, and are circumferentially spaced apart, as revealed in FIGS. 2 and 4.

Figure 4:
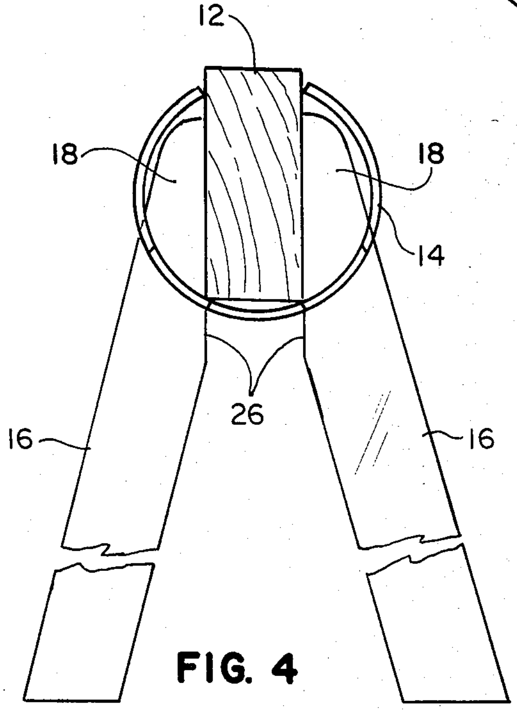
FIG. 4 is a cross sectional view taken through the central beam and through a generally circular member, revealing how latter member receives the upper ends of a pair of legs, and how the spreading of the legs in response to weight placed upon the sawhorse actually serves to cause the cut edges of the generally cylindrical member to tightly grasp the central beam.

Turning now to FIG. 4, it will be seen that the upper ends 18 of the legs 16 have been modified somewhat, so as to extend through the holes 20 on the underside of the generally circular member 14 so as to contact the central beam 12 of the sawhorse, but to avoid contacting the inner surface of member 14. As will be apparent from this figure, the longitudinal cut 22 made through the sidewall of the generally circular member 14 enables the natural resilience of this member to cause the sides of the cut to tightly grasp the central beam of the sawhorse in a pincers-like gripping action.

It will be appreciated that before the relatively sharp edges 24 of the member 14 can be caused to grasp the central beam 12, these longitudinal edges of the generally circular member must be spread apart. This may be easily brought about by the user first inserting the upper ends 18 of the legs 16 into their respective holes 20 which, as previously mentioned, are located essentially opposite the longitudinal cut 22, and are spaced apart circumferentially. Then, user grasps the bottoms of the pair of legs 16 and brings them together. This has the direct result of causing the longitudinal cut 22 to widen to such an extent as to receive one end of the longitudinal beam 12 therein. This deflection of the resilient sidewalls of the circular member 14 out of their normally circular configuration creates a substantial restoring force. Therefore, upon the legs being released, the edges 24 of the longitudinal cut tend, because of the natural resilience of the spring-like generally circular member 14, to grasp the longitudinal beam very tightly.

Figure 5:
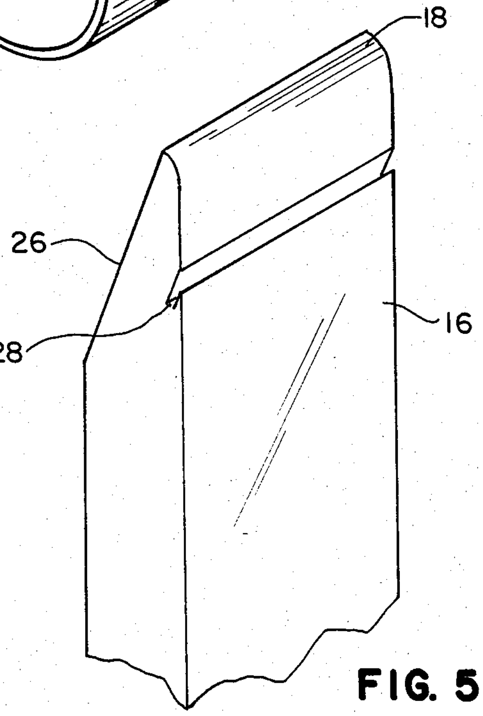
FIG. 5 is a view of the upper end of a typical leg member of the type received in one of the lower holes of the generally cylindrical member.

Although ordinary 2×4 legs with only minimal shaping could be inserted into the pair of leg holes 20 on the bottom of each generally circular member, and then suffice as the support for the central beam 12, I prefer to create a bevel edge 26 near the top of each leg, as shown in FIG. 4, but best seen in FIG. 5, for this makes it possible for the upper part of each leg to have a desirable amount of contact with the central beam of the sawhorse. Also, I prefer to round off the tops of the legs, but this is not mandatory.

Additionally, I have found that by cutting a transverse notch 28 on the side of the leg opposite the bevel 26, and somewhat near the top of the leg, the ability of my sawhorse to carry substantial load is increased. This notch is preferably not "V" shaped, but rather of the configuration clearly shown in FIG. 5.

It is to be realized that as shown in FIG. 4, each notch 28 engages the edge of the leg hole 20 that is closest to the longitudinal cut 22. Because this notch therefore is able to firmly engage a lower part of the generally circular member, it has the effect of pushing the cut edges 24 of the generally circular member more tightly into contact with the central beam 12 as the load on the sawhorse is increased. In other words, although the use of the notches is optional, when used, these notches bring about an automatic intensification of the gripping or locking action each generally circular member has with respect to its end of the longitudinal beam 12.

Other modifications within the spirit of this invention may in some instances be made, such as the use of a metal central beam 12, or metal legs 16. Also, the generally circular, spring-like members 14 could be constructed of certain metals or alloys, or of a plastic other than PVC, but I prefer for considerations of strength and economy, to use Schedule 40 PVC pipe, which desirably has a sidewall of substantial thickness.

Although the size PVC pipe utilized may be based upon factors such as whether the center beam of the sawhorse is finished lumber or not, or to be sized to accommodate other than a 2×4 or a 2×6 member, in the event a 2×4 of finished lumber is used, the PVC I prefer to use has a three inch inside diameter.

Another advantage of my instant sawhorse is the ease with which it may be disassemblied, and packed into a small space. However, it is also true that should the user wish to move my nail-less sawhorse to a nearby location, this may be accomplished by grasping the center beam and lifting the sawhorse, with the knowledge that it will not likely disassemble or fall apart on its own. As previously mentioned, the use of a slot 28 near the top of each leg is an option, but if this slot is used on each of the four legs, the sudden dissassembly of the sawhorse during the moving procedure is even less likely to occur.

I prefer for the legs 16 of my sawhorse to reside at a 75° angle to the horizontal, which of course is 15° off the vertical. Accordingly, I prefer for the bevel 26 near the top of each leg 16 to be cut at a 15° angle to the long axis of these leg members. Also, I prefer to round off the top 18 of each leg on the side opposite the bevel 26 (that is, the rounding is on the same side as the notch 28), so that the uppermost part of each leg will be out of contact with the interior portion of the member 14. Note FIG. 4 in this latter regard The bottom of each leg should be trimmed in consonance with the angle the legs are to make with the vertical, so if for example, the legs are to bear a 15° angle to the vertical, a 15° cut should be made across the bottom of each leg.

I claim:

1. A sawhorse member utilizing no nails or other fasteners in its construction, comprising an elongate, generally circular member having a comparatively thick sidewall, but being otherwise hollow, said member being made of resilient material, with its sidewall being longitudinally cut for its entire length in a direction generally parallel to the centerline of said generally circular member, thus in effect to define a generally circular spring, a pair of holes cut through the sidewall of said generally circular member at a location substantially opposite from said longitudinal cut, said holes being circumferentially spaced apart, and each being substantially equidistant from the ends of said circular member, each of said holes being arranged to receive the upper end of an elongate leg member, whereby as the bottoms of said leg members are drawn together, the edges of said cut are caused to move apart, so as to be able to receive the central beam of a sawhorse, and to tightly grasp such beam in a pincers-like grip when said leg members are released.

2. The sawhorse member as defined in claim 1 wherein said generally circular member is made of PVC.

3. The sawhorse member as defined in claim 1 wherein said generally circular member is made of metal.

4. The sawhorse member as defined in claim 1 wherein a notch of approximately 60° is created along on the exterior of said longitudinal cut.

5. The sawhorse member as defined in claim 1 wherein the upper ends of said leg members are beveled, and a notch adapted to engage the sidewall of said generally circular member is disposed at a location on each of the upper leg members substantially opposite such bevel.

6. The sawhorse member as defined in claim 1 wherein said generally circular member is used adjacent one end of the central beam of a sawhorse, and a similar such member is used adjacent the other end of such beam.

7. Sawhorse members utilizing no nails or other fasteners comprising a pair of elongate, generally circular members, each having a comparatively thick sidewall, but being otherwise hollow, said members being made of resilient material, with their sidewalls being longitudinally cut for their entire length in a direction generally parallel to the centerline of each of said generally circular members, thus in effect to define a pair of generally circular springs, a pair of holes cut through the sidewall of each of said generally circular members at a location substantially opposite from said longitudinal cut, said holes being circumferentially spaced apart, and each being substantially equidistant from the ends of the respective circular member, each of said holes being arranged to receive the upper end of an elongate leg member, whereby as the bottoms of each pair of said said leg members are drawn together, the edges of said cut are caused to move apart, so as to be able to receive the central beam of a sawhorse, and to tightly grasp such beam in a pincers-like grip when said leg members are released.

8. The sawhorse members as defined in claim 7 wherein said generally circular members are made of PVC.

9. The sawhorse members as defined in claim 7 wherein said generally circular members are made of metal.

10. The sawhorse member as defined in claim 7 wherein a notch of approximately 60° is created along on the exterior of said longitudinal cut.

11. The sawhorse members as defined in claim 7 wherein the upper ends of said leg members are beveled, and a notch adapted to engage the sidewall of the respective circular member is disposed at a location on the upper leg members substantially opposite such bevel.

* * * * *